Dec. 23, 1930.   R. W. HOMPE   1,785,904
CANDY MOLDING
Filed April 29, 1927    5 Sheets-Sheet 3

INVENTOR.
Robert W. Hompe
BY
Fay, Oberlin + Fay
ATTORNEYS.

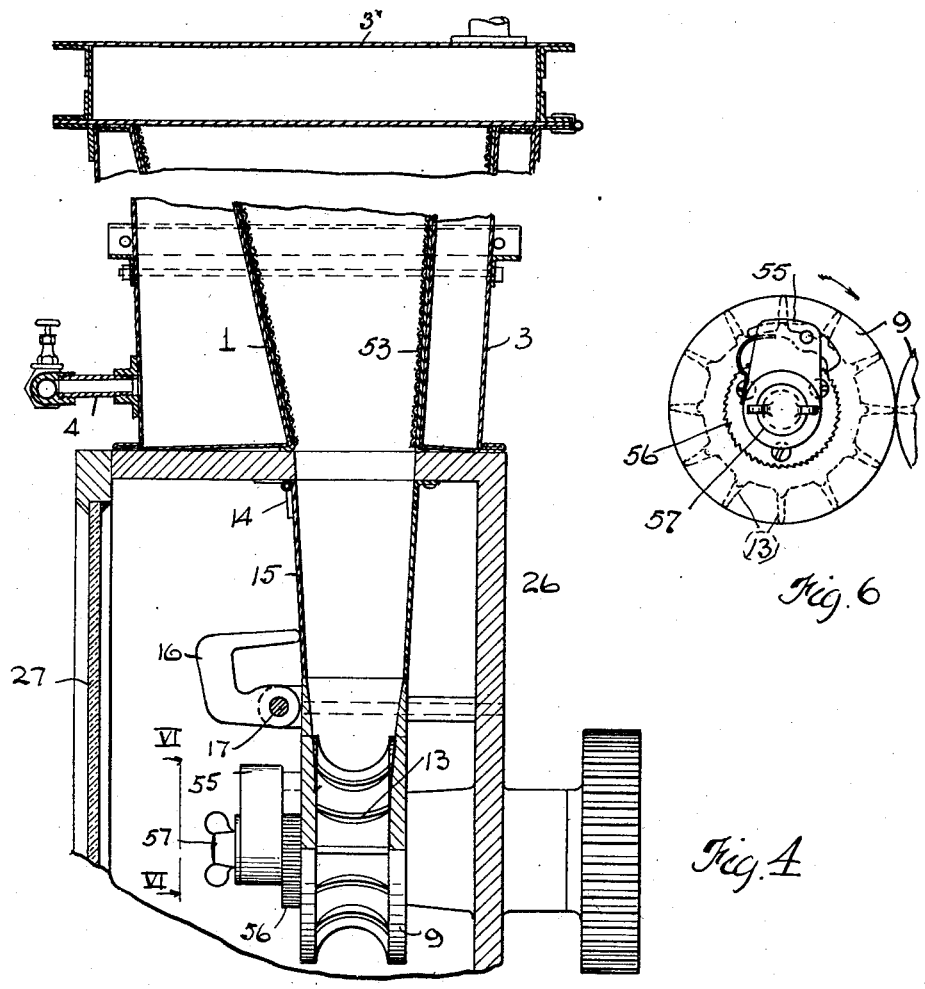

Dec. 23, 1930.  R. W. HOMPE  1,785,904
CANDY MOLDING
Filed April 29, 1927  5 Sheets-Sheet 5
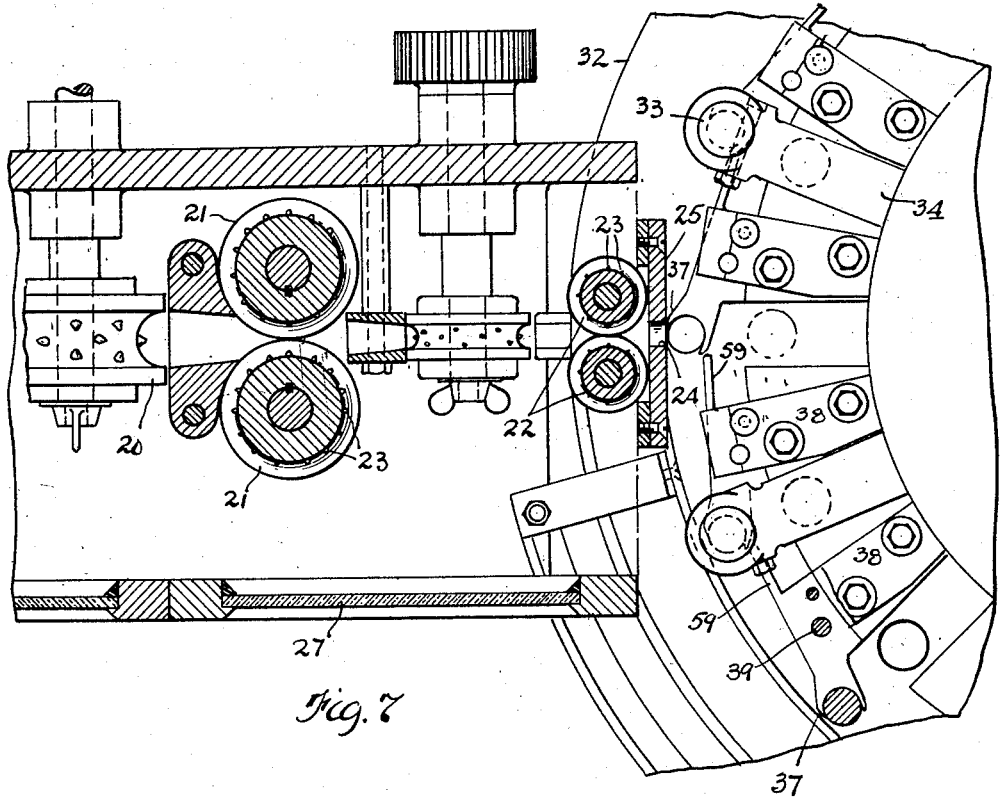
Fig. 7
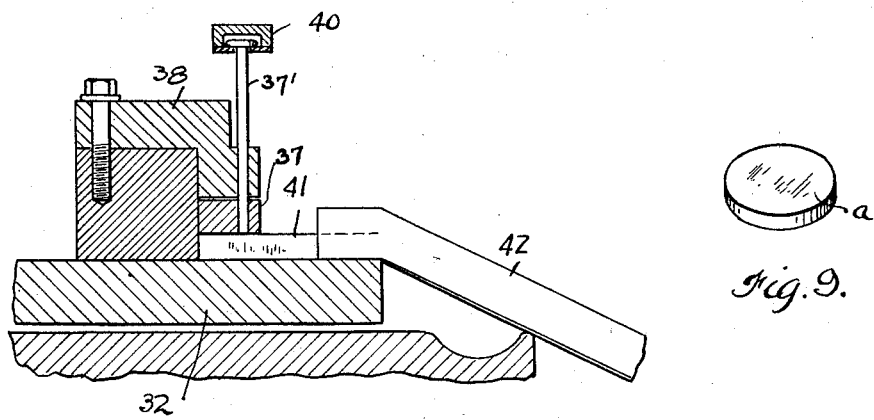
Fig. 8.
Fig. 9.
INVENTOR.
Robert W. Hompe
BY
Fay, Oberlin & Fay
ATTORNEYS.

Patented Dec. 23, 1930

1,785,904

UNITED STATES PATENT OFFICE

ROBERT W. HOMPE, OF CLEVELAND, OHIO

CANDY MOLDING

Application filed April 29, 1927. Serial No. 187,592.

This invention relates to candy molding, and more particularly the molding of hard candy stocks. In dealing with such stocks, it has been customary heretofore to draw the batch down to desired diameter and cut off lengths to stick size or short lengths to piece size for bulk sale, or as a further refinement, pieces were cut off and fed to a wrapping machine, but the inherent difficulties in handling such stocks have precluded shaping other than by sizing rolls and cutters. In accordance with the present invention however, I am enabled to handle stocks of this character in a manner to make possible die shaping to a product of excellent qualities.

To the accomplishment of the foregoing and related ends, the invention, then, consists of the features hereinafter fully described, and particularly pointed out in the claims, the following description and the annexed drawings setting forth in detail certain mechanism contemplated in the invention, such means however being illustrative of but one of the various ways in which the principle of the invention may be employed.

In said annexed drawings:—

Figure 1:
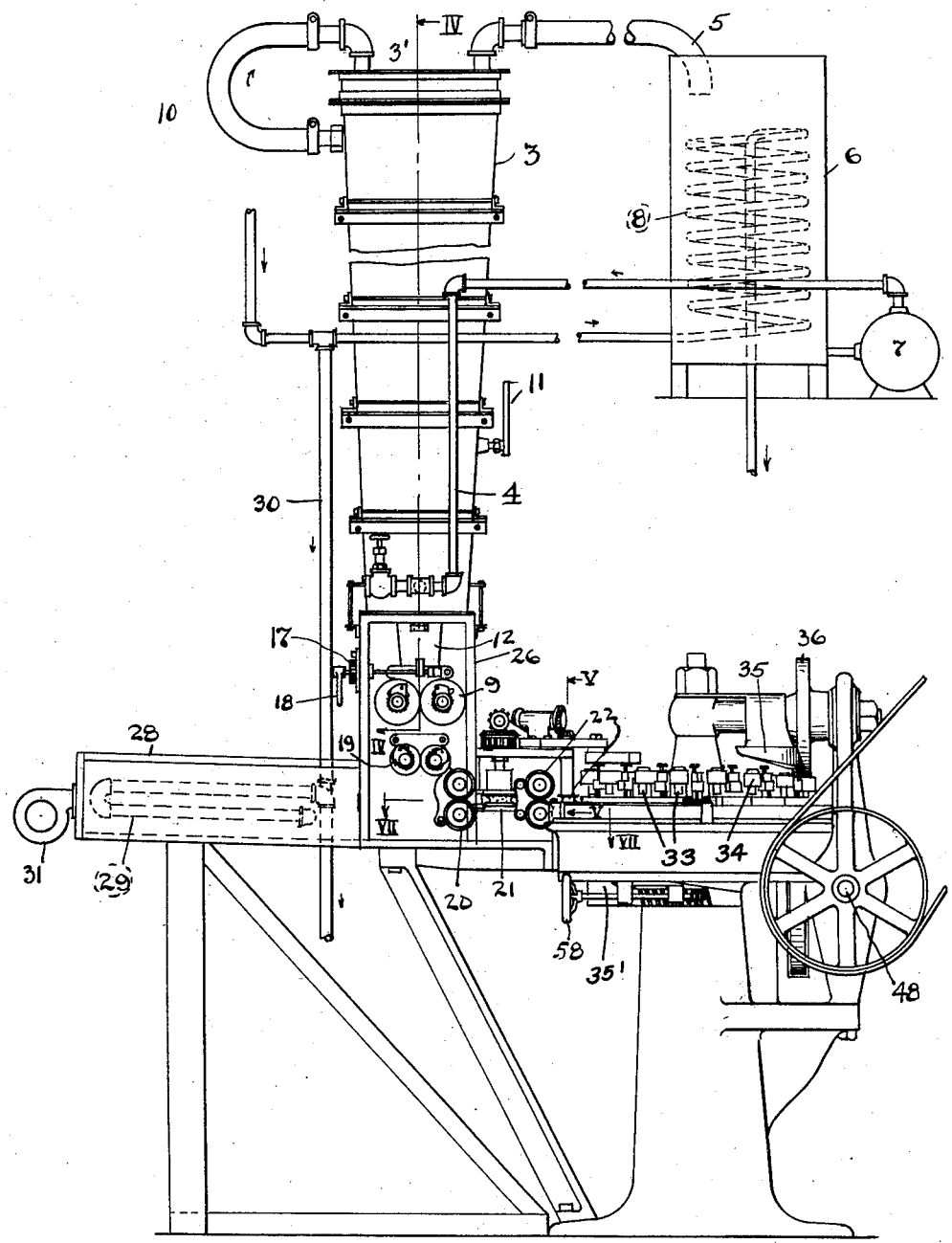
Figure 2:
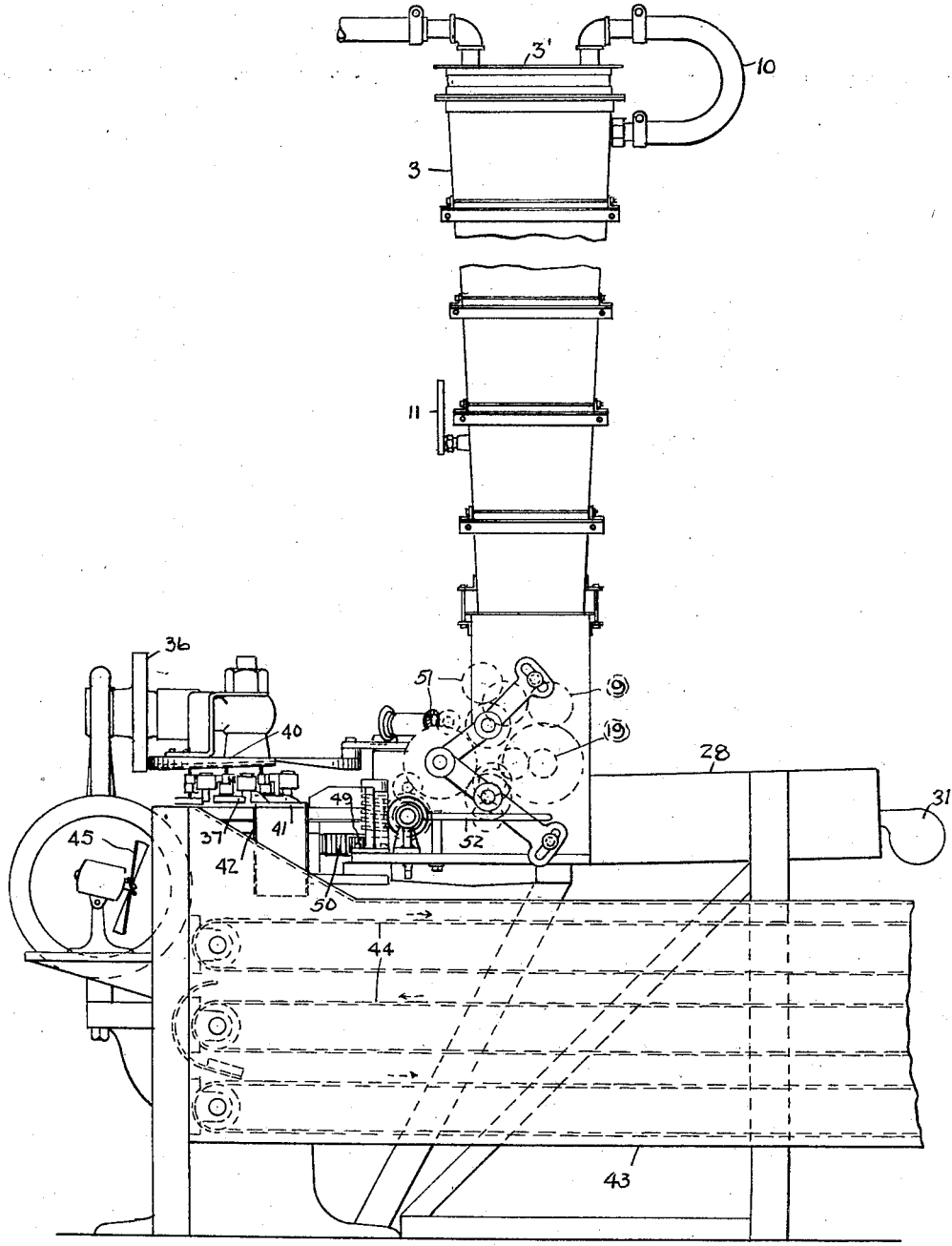
Figure 3:
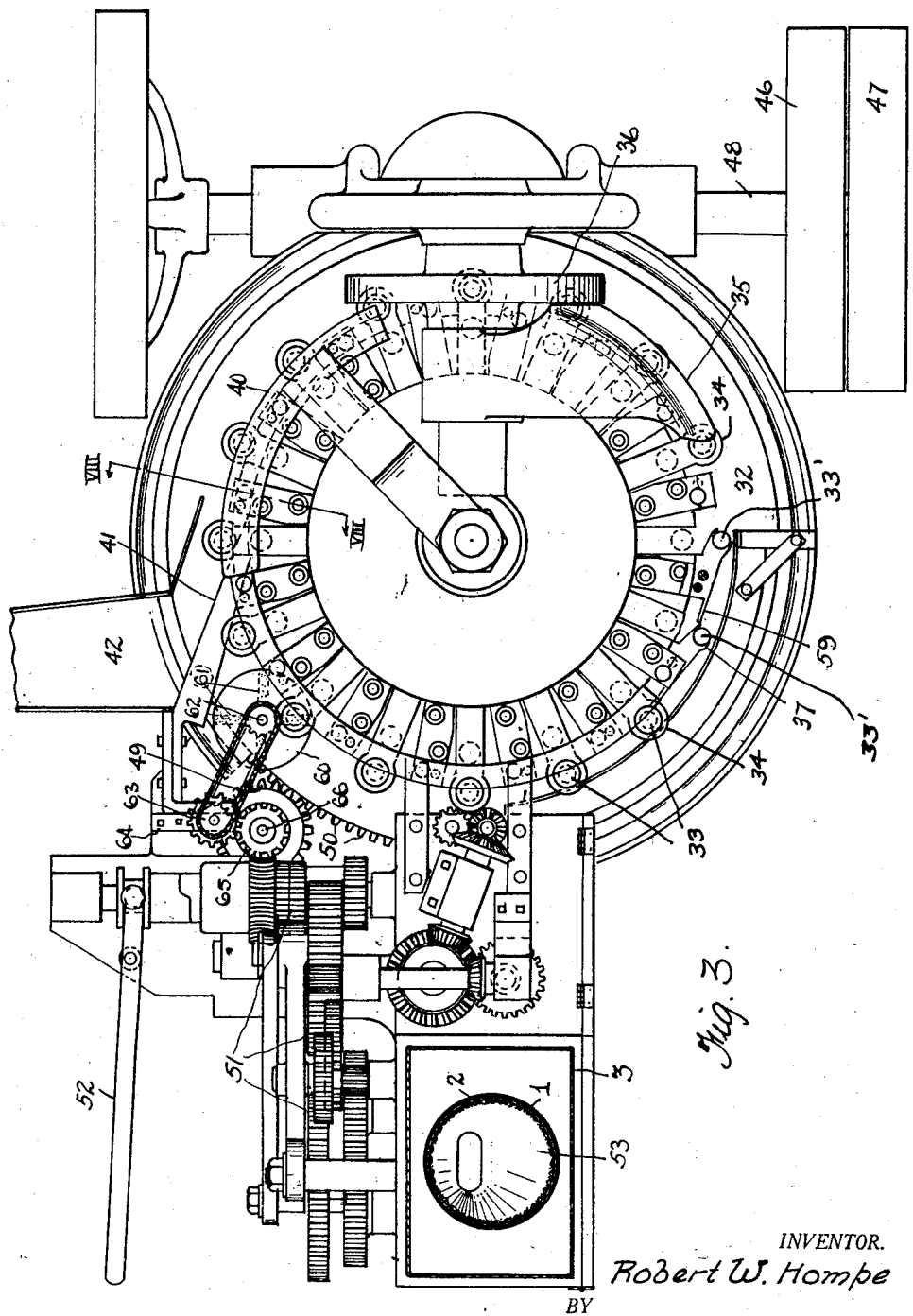

Fig. 1 is a front elevation of an embodiment of the invention; Fig. 2 is a rear elevation; Fig. 3 is a plan view; Fig. 4 is a vertical section on an enlarged scale taken on a plane indicated by the line IV—IV, Fig. 1; Fig. 5 is a sectional detail on an enlarged scale taken on a plane indicated by the line V—V, Fig. 1; Fig. 6 is a sectional detail taken on a plane indicated by the line VI—VI, Fig. 4; Figs. 7 and 8 are enlarged sectional details taken respectively on line VII—VII, Fig. 1, and line VIII—VIII, Fig. 3; and Fig. 9 is a perspective view of a product formed.

Referring more particularly to the drawings, the reference numeral 1 designates a feed hopper within which is a removable sheet metal liner-shell 2. A jacket-chamber 3 surrounds the hopper and is adapted to contain hot water, having an inlet pipe 4 and a discharge pipe 5 connecting with a tank 6. A circulating pump 7 forwards the water through pipe 4 from the tank 6. The latter is maintained at suitable temperature by any convenient means, for example a steam coil 8 within the tank. The top of the hopper is advantageously closed by a cover 3', which in order to conserve uniform temperature conditions within may be also hollow as a water jacket, and connecting with the jacket 3 by a flexible or movable connection 10. In this arrangement, as will be seen, the temperature of the feed hopper may be maintained at desired range, the hot water being circulated around through the jacket and the heating tank 6. A thermometer 11 may be provided in the hopper jacket as an aid to control.

In the path of the outlet 12 of the hopper is a pair of drawing rolls 9, these, or at least one of them, being provided with gripping ridges or the like 13 whereby to minimize slippage. One side of the hopper spout is desirably openable, and to such end it may be hinged as at 14 whereby it may be swung open, as is particularly of advantage in starting a mass of candy stock down through the rolls. The swing side 15 may be retained in closed position by any desired means for example a latch 16 carried by a stem 17, an operating handle 18 on the end thereof facilitating its manipulation.

Beyond the drawing rolls 9 a further series of drawing rolls 19 and 20, with directive guides in conjunction therewith serve to draw down and forward a strand of the candy stock. Further rolls 21 and 22, preferably provided with non-slip projections 23 forward the strand of candy material in turn through outlet 24 in plate 25. The outlet end of the hopper 12, and the system of rolls are housed in a casing 26, one side of which is preferably glassed, as at 27. An extension 28 contains a steam coil 29 supplied from the pipe 30 and suitably controlled, and a blower 31 is arranged to provide a circulation of hot air through the housing. In this manner it will be seen that the temperature of the strand of candy material being drawn can be controlled as desired. Opposite the plate 25 is a molding press, preferably in form of a continuous carrier, for instance a rotary table 32. The table contains a plurality of die-cavities, and within each cavity a lower and an upper plunger are reciprocably mounted. The upper plungers 33 are slidably carried in guides 34, their excursion of movement being such that in their upper positions the die-cavities are freely exposed. In Figs. 3 and 7 certain of the upper plungers are removed in order to show the die cavities and lower plungers. The lower plungers 33′ have a range of motion to allow of being raised flush with the top of the table for discharge of the molded product. Cams determine the movement of such plungers, a depression cam 35 being arranged to engage the heads of the upper plungers with a progressive compressive result, and the pressure roller 36 is arranged to complete the compression. Coacting with each die-cavity is a shear-blade 37, these being mounted on supports 38 between the dies, and having securing bolts 39. The shear-blades 37 it will be observed, in their path of movement with the rotary table, slide across the face of plate 25 which acts as a shear-plate. In this manner, the strand of candy material as forwarded by the last set of rolls 22, is engaged by the shear-edge 37 in coaction with the shear-plate 25, thus severing a blank which feeds into the die-cavity, the die-plungers being at this time in their furthest out position.

Beyond the compression roll 36, there is arranged a lifter-cam 40 which engaging the heads of lifter pins 37′ on the cutters 37 raises the latter. At the same time the lower plungers are pushed up by a cam 35′, Fig. 1, so that they are level with the table of the machine, and the molded piece is free from the die. A fixed plow blade or scraper 41 is mounted in the path of the thus raised molded articles, and with the onward sweep of the table, such articles are discharged down the chute 42 which leads into a cooling chamber 43. This may vary somewhat in its detail, but conveniently may contain a series of travelling belts 44 upon which the molded pieces are fed, one belt discharging at the end of its run onto the next lower belt, and so on in series to the final discharge into a receiving box. A fan 45 is arranged to circulate the air through such cooling chamber, and if desired, further cooling means in the form of ice trays, or cooling coils, may be provided.

The main power drive for the machine is applied at the pulley 46, a loose pulley 47 or the like allowing of throwing the machine out of gear when desired. From the main shaft 48, a worm gear drives the table or die-carrier 32. A pinion 49 meshing with gear teeth 50 on the periphery of the mold table transmits in turn to gearing 51 controlled by a clutch and lever 52, and from such gearing in turn, the individual drawing and sizing rolls are driven, the precise detail of such further gearing being immaterial.

As will be understood from the foregoing, candy stock to be molded, generally after a preliminary kneading on a cooling or moderating table to prepare the mass as it comes from the kettle for the subsequent drawing, is shaped into a form roughly approximating the hopper, so as to facilitate feed, and is introduced. In order to prevent sticking, a lubricant-carrying facing 53 is provided, to carry for instance a coating of starch or flour, etc., such a dusting powder usually being preferable to an oil. Being started in the first drawing rolls 9, the candy stock is forwarded thence progressively through the further rolls, to the shear-plate. The temperature of the hopper is maintained by means of the hot water control in the jacket, to allow of the necessary feeding plasticity, and the temperature necessary in the housing about the drawing and sizing rolls is further controlled by the blower 31 and steam coil. From the shear-plate 25, the strand of candy material emerges to be encountered by the shearing edges 37, successive blocks or blanks being thus sheared off as the rotary table 32 carries the shearing edges in succession across the shear-plate 25, each blank feeding to its die. With the further rotation of the table in turn, the die-plungers are engaged by the depressing cams, the press-roll 36 giving the final compression, and beyond this the plungers are again retracted, the lower plunger raising the die-molded candy flush with the top of the table, whereupon the plow 41 discharges such pieces through the chute 42 into the cooler 43 where the pieces are quickly chilled beyond possibility of deformation, and are discharged for final packing, for example as of the form $a$ as shown in Fig. 9.

In order to prevent irregular drawing, as might otherwise sometimes tend to occur, some at least of the drawing rolls are provided with slip-ratchets 55, such ratchet-pawl engaging a ratchet-wheel 56 on the shaft 57, whereby in event of undue resistance on any particular roll, the ratchet will allow sufficient slippage to prevent uneven drawing down of the candy strand.

Any recesses which might be otherwise left exposed between dies may be walled across by any suitable filler or barrier means, as for instance by barrier extensions 59 on the blades. A means for keeping the top of the table clean is also usually desirable, and this may take the form of a brush, preferably a rotary brush; for instance, a disk 60 may carry brush elements 61, being mounted on a stub-shaft 62 and being driven by a sprocket and chain from a sprocket 63 mounted on a bracket 64 and actuated from gearing 65 on the shaft 66 which carries the gear 49. The brush is preferably driven in opposite direction from that of the table.

It will thus be seen that my method and apparatus as a whole provide control of conditions at each stage of progress such as to facilitate handling of the candy stock mass, with die-shaping under pressure, and chilling or cooling to set the finished pieces without deformation. At the same time, the mechanism in its various parts is readily adapted for accessibility for cleaning and for adjustment and repair.

Other modes of applying the principle of the invention may be employed, change being made as regards the details disclosed, provided the means stated in any of the following claims, or the equivalent of such, be employed.

I therefore particularly point out and distinctly claim as my invention:—

1. In a candy-molding machine, the combination of a die press comprising a plurality of dies adapted to enter corresponding die cavities, and a cutter for each die to sever the stock therefor, each of said cutters being movable with respect to said die cavities.

2. In a candy-molding machine, the combination of a rotary table, a plurality of die-cavities in said table, die-plungers reciprocable in the die-cavities, a shear-plate adjacent the path of the die-cavities and having an aperture therein, and a plurality of shear-blades carried by the table and adapted to move successively across said aperture.

3. In a candy-molding machine, the combination of a rotary table, a plurality of die-cavities in said table, die-plungers reciprocable in each die-cavity, cams for actuating said plungers, a stationary shear-plate adjacent the path of the die-cavities and having an aperture therein, and a plurality of shear-blades carried by the table, one adjacent each die-cavity and movable across said aperture in said shear-plate.

4. In a candy-molding machine, the combination of a rotary table, a plurality of die-cavities in said table, die plungers reciprocable in the die-cavities, cams for actuating said plungers, a stationary shear-plate adjacent the path of the die-cavities, means for feeding a strand of candy across said shear-plate, and a plurality of shear-blades carried by the table, one adjacent each die-cavity and cooperative with the shear-plate.

5. In a candy-molding machine, the combination of a rotary table, a plurality of die-cavities in said table, die-plungers reciprocable in the die-cavities, cams for actuating said plungers, a stationary shear-plate adjacent the path of the die-cavities, means for feeding a strand of candy across said shear-plate, a plurality of shear-blades carried by the table, one adjacent each die-cavity and cooperative with the shear-plate, and an extension on said blades forming a barrier between die-cavities.

6. In a candy-molding machine, the combination of a series of sizing-rolls, a shear-plate for receiving a strand of candy from said rolls, a rotary carrier, a plurality of die-cavities in said carrier, die-plungers reciprocable in the die-cavities, and a plurality of shear-blades carried by the table, one blade adjacent each die-cavity and cooperative with the shear-plate.

7. In a candy-molding machine, the combination of a feed-hopper, a series of sizing-rolls, a rotary table, a plurality of die-cavities in said table, a set of die-plungers reciprocable in each die-cavity, a shear-plate adjacent the path of the die-cavities for receiving a strand of candy from said rolls, a plurality of shear-blades carried by the table, a plow overlying said table and adapted to remove articles therefrom, and means for lifting said shear-blades to avoid said plow.

8. In a candy molding machine, a rotary table, a shear-plate mounted adjacent the periphery of said table for receiving a strand of candy from a source of supply, a plurality of shear-blades carried by said table and adapted to cooperate with said shear-plate to deposit candy blanks on said table, a plow overlying said table to remove said blanks from said table, and means for lifting said blades to avoid said plow.

9. In a candy molding machine, a rotary table formed with a plurality of die-cavities, a shear-plate adjacent the path of said cavities for receiving a strand of candy from a source of supply, a plurality of shear-blades carried by said table and adapted to cooperate with said shear-plate to deposit candy blanks in said cavities, means to discharge said blanks from said cavities, a plow overlying said table to remove said blanks from said table, and means for lifting said blades to avoid said plow.

Signed by me this 25th day of April, 1927.
ROBERT W. HOMPE.